United States Patent [19] [11] 4,399,272
Sakurai et al. [45] Aug. 16, 1983

[54] PROCESS FOR PRODUCING POLYACETAL COPOLYMERS

[75] Inventors: Hisaya Sakurai; Minoru Hamada; Kazuhiko Matsuzaki; Muneaki Aminaka, all of Kurashiki, Japan

[73] Assignee: Asahi Kasei Kogyo Kabushiki Kaisha, Osaka, Japan

[21] Appl. No.: 204,085

[22] Filed: Nov. 4, 1980

[30] Foreign Application Priority Data

| Nov. 15, 1979 | [JP] | Japan | 54/148087 |
| Nov. 15, 1979 | [JP] | Japan | 54/148088 |
| Dec. 31, 1979 | [JP] | Japan | 54/172642 |
| Feb. 12, 1980 | [JP] | Japan | 55/15778 |
| Apr. 10, 1980 | [JP] | Japan | 55/47133 |

[51] Int. Cl.$^3$ .................. C08G 2/18; C08G 2/22; C08G 2/24
[52] U.S. Cl. .................. 528/233; 525/405; 525/414; 528/232; 528/236; 528/237; 528/230; 528/238; 528/239; 528/240; 528/242; 528/243; 528/249; 528/250
[58] Field of Search ............... 528/230, 232, 233, 237, 528/249, 236, 238, 239, 240, 242, 243, 250; 525/405, 414

[56] References Cited

U.S. PATENT DOCUMENTS

| 3,278,635 | 10/1966 | Bastian | 528/233 |
| 3,419,530 | 12/1968 | Tiessens et al. | 528/233 |
| 3,803,094 | 4/1974 | Ishii et al. | |
| 3,862,090 | 1/1975 | Munoz | 528/237 |
| 4,173,551 | 11/1979 | Crivello | 528/232 |

FOREIGN PATENT DOCUMENTS

| 236669 | 3/1959 | Australia | 528/232 |
| 1495496 | of 1969 | Fed. Rep. of Germany | |
| 1495534 | of 1971 | Fed. Rep. of Germany | |
| 6703805 | 9/1968 | Netherlands | 528/232 |
| 911960 | of 1962 | United Kingdom | |
| 1009930 | 11/1965 | United Kingdom | 528/232 |

OTHER PUBLICATIONS

N. Brown, "Polyaldehydes", pp. 11 and 12, 1967.

Primary Examiner—Wilbert J. Briggs, Sr.
Attorney, Agent, or Firm—Birch, Stewart, Kolasch & Birch

[57] ABSTRACT

A process for producing a polyacetal copolymer, which comprises copolymerizing formaldehyde and a compound selected from the group consisting of alkylene oxides, poly(alkylene oxides), cyclic formals and poly (cyclic formals) in the presence of a Lewis acid and an anionic polymerization catalyst with the exception of metal chelate compounds.

31 Claims, No Drawings

PROCESS FOR PRODUCING POLYACETAL COPOLYMERS

This invention relates to a process for producing polyacetal copolymers. More particularly, it relates to a process for copolymerizing formaldehyde and a compound selected from the group consisting of alkylene oxides, polyalkylene oxides, cyclic formals and poly(cyclic formals) in the presence of an anionic polymerization catalyst and a Lewis acid.

British Pat. No. 911,960 discloses the copolymerization of formaldehyde and a vinyl compound or an alkylene oxide with a Friedel-Crafts catalyst. West German Pat. No. 1,495,496 discloses the cationic copolymerization of formaldehyde and 1,3-dioxacycloheptane. It is also described in U.S. Pat. No. 3,803,094 that a formaldehyde copolymer is produced by using as the catalyst a reaction mixture of a polyvalent metal chelate compound and a Lewis acid, which has been prepared by mixing together both reactants.

The catalysts that are described in the above patent literature are substantially Lewis acids. When formaldehyde is copolymerized by using a Lewis acid as the catalyst, the formation of a random copolymer is possible, but owing to the prevalent side reaction (chain-scission reaction) it is difficult to obtain a copolymer having a high molecular weight sufficient for practical use.

In West German Pat. No. 1,495,534, a description is made about the copolymerization of formaldehyde and a cyclic ether by use of an amine. The copolymerization reaction with an anionic polymerization initiator such as an amine gives predominantly homopolymers of each formaldehyde and cyclic ether and little copolymer; even if a copolymer is formed in a small proportion, it is a block copolymer of polyoxymethylene and poly(cyclic ether) and, hence, is of little practical use as a polyacetal copolymer.

As described in the foregoing, with use of either a Lewis acid or an anionic polymerization initator alone, it is difficult to obtain a polyacetal copolymer possessing the performance-characteristics required for engineering plastics.

The present inventors made extensive studies on the copolymerization of formaldehyde and, as a result, found that a polyacetal copolymer having excellent stability is obtained in a high yield by copolymerizing formaldehyde and a compound selected from the group consisting of alkylene oxides, poly(alkylene oxides), cyclic formals and poly(cyclic formals) in the presence of both a Lewis acid and an anionic polymerization catalyst with the exception of metal chelate compounds. Based on the above findings, the present invention has been accomplished.

This invention, therefore, provides a process for producing a random copolymer having a sufficiently high molecular weight from formaldehyde as a starting material.

The invention is described below in detail.

According to this invention, the compound to be copolymerized with formaldehyde is selected from the group consisting of alkylene oxides, poly(alkylene oxides), cyclic formals and poly(cyclic formals).

Of alkylene oxides, mention should be made, in the first place, of a group of compounds having a structure represented by the general formula

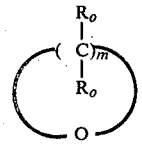

wherein each $R_o$, which may be the same or different, is selected from the group consisting of hydrogen atom, alkyl groups, and substituted alkyl groups, aryl groups and substituted aryl groups; m is an integer from 2 to 6. Examples of this group of alkylene oxides include ethylene oxide, propylene oxide, butylene oxide, trans-2,3-epoxybutane, cis-2,3-epoxybutane, isobutylene oxide, oxetane, 3,3-bis(chloromethyl)oxetane, tetrahydrofuran, 2-methyltetrahydrofuran, oxepane, styrene oxide, p-chlorostyrene oxide and epichlorohydrin. Beside these compounds, cyclohexene oxide may be used. Of the alkylene oxides mentioned above, preferred are ethylene oxide, propylene oxide, butylene oxide, styrene oxide and cyclohexene oxide.

Poly(alkylene oxides) for use in the present process are those compounds which have a structure represented by the general formula

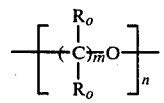

wherein each $R_o$, which may be the same or different, is selected from the group consisting of hydrogen atom, alkyl groups, substituted alkyl groups, aryl groups and substituted aryl groups; m is an integer of 2 to 6 and n is 3 to 20,000. Poly(alkylene oxides) are generally prepared by the ring-opening polymerization of corresponding alkylene oxides of the formula:

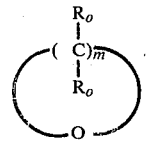

The first group of poly(alkylene oxides) is poly(ethylene oxides), which are the ring-opening polymerization products of ethylene oxide, and derivatives thereof. Examples of this group of compounds include poly(ethylene glycol) (average molecular weight, 1,500), poly(ethylene glycol diacetate) (average molecular weight, 10,000), poly(ethylene glycol dimethyl ether) (average molecular weight, 15,000), poly(ethylene glycol p-nonylphenyl ether) (average molecular weight, 2,350), poly(ethylene glycol monostearate) (average molecular weight, 2,810), glycerol-ethylene oxide adduct (average molecular weight, 5,200), trimethylolpropane-ethylene oxide adduct (average molecular weight, 920), sorbitan monolaurate-ethylene oxide adduct (average molecular weight, 2,350), pentaerythritol-ethylene oxide adduct (average molecular weight, 3,400), poly(ethylene oxide) (PEO, average molecular weight 50,000) and poly(ethylene oxide) (PEO, average molecular weight 400,000).

The second group of poly(alkylene oxides) is poly(propylene oxides), which are the ring-opening polymerization products of propylene oxide, and derivatives thereof. Examples of this group of compounds include poly(propylene glycol) (average molecular weight, 7,500), poly(propylene glycol monolaurate) (average molecular weight, 15,000), poly(propylene glycol dimethyl ether) (average molecular weight, 6,000), trimethylolpropane-propylene oxide adduct (average molecular weight, 7,150), pentaerythritol-propylene oxide adduct (average molecular weight, 1,150), and poly(propylene oxide) (PPO, average molecular weight 100,000).

The third group of poly(alkylene oxides) includes poly(butylene oxides), which are the ring-opening polymerization products of butylene oxide, and derivatives thereof. Examples include poly(butylene glycol) (average molecular weight, 2,000), poly(butylene glycol dipropionate) (average molecular weight, 4,300), and poly(butylene glycol dimethyl ether) (average molecular weight, 1,000).

The fourth group of poly(alkylene oxides) is poly(trimethylene oxides) and derivatives thereof, which are ring-opening polymerization products of oxetane and substituted oxetanes. Examples include tri(methylene glycol) (average molecular weight, 450), tri(methylene glycol dimethyl ether) (average molecular weight, 610), and ring-opening polymerization products of 3,3-bis(chloromethyl)oxetane.

The fifth group of poly(alkylene oxides) is poly(tetramethylene oxides) which are ring-opening polymerization products of tetrahydrofuran and substituted tetrahydrofurans. Examples include poly(tetramethylene glycol) (average molecular weight, 1,250) and poly(tetramethylene glycol dimethyl ether) (average molecular weight, 1,750).

The sixth group of poly(alkylene oxides) is poly(hexamethylene oxides) which are ring-opening polymerization products of oxepane and substituted oxepanes. Examples include poly(hexamethylene glycol) (average molecular weight, 850) and poly(hexamethylene glycol dimethyl ether) (average molecular weight, 650).

The seventh group of poly(alkylene oxides) is poly(styrene oxides) and derivatives thereof, which are ring-opening polymerization products of styrene oxide and substituted styrene oxides. Examples include poly(styrene glycol) (average molecular weight, 1,850), poly(styrene glycol dimethyl ether) (average molecular weight, 4,500), and poly(p-chlorostyrene glycol) (average molecular weight, 2,750).

Beside the above seven groups of compounds, poly(alkylene oxides) obtained by the ring-opening polymerization of alkylene oxides other than those mentioned above are also effective. For instance, polymers obtained by the ring-opening polymerization of epichlorohydrin or cyclohexene oxide may also be used in the process of this invention.

Of the aforementioned poly(alkylene oxides), particularly preferred are poly(ethylene oxides), derivatives thereof, poly(propylene oxides) and derivatives thereof.

The average degree of polymerization (n) of the poly(alkylene oxides) should be in the range from 3 to 20,000. It is preferable that the lower limit of the average degree of polymerization be 10 from the viewpoint of avoiding as far as possible the chain transfer reaction during copolymerization, while the upper limit be 10,000 from the viewpoint of ease in the synthesis of poly(alkylene oxides). In case the compound contains two or more poly(alkylene oxide) chains in the molecule such as, for example, a glycerol-ethylene oxide adduct

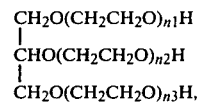

the average degree of polymerization of each chain ($n_1$, $n_2$, $n_3$, . . . ) should be in the range from 3 to 20,000, preferably from 10 to 10,000.

As to the cyclic formals, in the first place mention should be made of cyclic alkylene glycol formals having a structure represented by the general formula

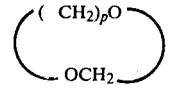

wherein p is an integer of 2 to 10. This group of cyclic formals includes ethylene glycol formal, 1,3-propanediol formal, 1,4-butanediol formal, 1,5-pentanediol formal, 1,6-hexanediol formal, 1,7-heptanediol formal, 1,8-octanediol formal, and 1,10-decanediol formal. Of these cyclic formals, particularly preferred are ethylene glycol formal, 1,4-butanediol formal, 1,5-pentanediol formal, and 1,6-hexanediol formal.

The second group of cyclic formals is cyclic poly(ethylene glycol) formals having a structure represented by the general formula

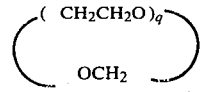

wherein q is an integer of 2 to 15. Examples of the cyclic formals included in this group are diethylene glycol formal, triethylene glycol formal, tetraethylene glycol formal, hexaethylene glycol formal, decaethylene glycol formal, and poly(ethylene glycol-200) formal. Of these cyclic formals, particularly preferred are diethylene glycol formal, triethylene glycol formal and tetraethylene glycol formal.

Cyclic formals having a structure represented by the general formula

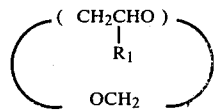

wherein $R_1$ is an alkyl group or aryl group, may also be used in the present process. Included in this group are, for example, propylene glycol formal, butylene glycol formal and styrene glycol formal.

Poly(cyclic formals) to be mentioned in the first place are poly(cyclic alkylene glycol formals) having a structure represented by the general formula

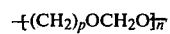

wherein p is an integer of 2 to 10 and n' is 3 to 20,000. These poly(cyclic formals) are obtained by the ring-opening polymerization of corresponding cyclic alkylene glycol formals.

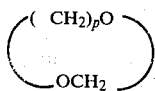

The poly(cyclic formals) included in this group are poly(ethylene glycol formal), poly(1,3-propanediol formal), poly(1,4-butanediol formal), poly(1,5-pentanediol formal), poly(1,6-hexanediol formal), poly(1,7-heptanediol formal), poly(1,8-octanediol formal) and poly(1,10-decanediol formal). Of these formals, particularly preferred are poly(ethylene glycol formal), poly(1,4-butanediol formal), poly(1,5-pentanediol formal) and poly(1,6-hexanediol formal).

Poly(cyclic formals) included in the second group are poly(polyethylene glycol formal) having a structure represented by the formula

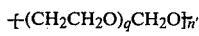

wherein q is an integer of 2 to 15 and n' is 3 to 20,000. These compounds are obtained by the ring-opening polymerization of corresponding poly(ethylene glycol formal),

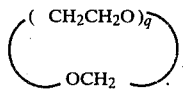

Examples of these formals include poly(diethylene glycol formal), poly(triethylene glycol formal), poly(tetraethylene glycol formal), poly(hexaethylene glycol formal), and poly(polyethylene glycol-200 formal). Of these formals particularly preferred are poly(diethylene glycol formal), poly(triethylene glycol formal), and poly(tetraethylene glycol formal).

Poly(cyclic formals) having a structure represented by the general formula

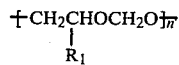

(wherein, $R_1$ is an alkyl or aryl group and n' is 3 to 20,000) may also be used in the present process. These poly(cyclic formals) are obtained generally by the ring-opening polymerization of corresponding cyclic formals

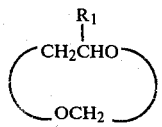

and include, for example, poly(propylene glycol formal), poly(butylene glycol formal), and poly(styrene glycol formal).

The average degree of polymerization (n') of the poly(cyclic formals) should be in the range from 3 to 20,000. The lower limit of the average degree of polymerization is preferably 5 from the viewpoint of avoiding as far as possible the chain transfer reaction during copolymerization, while the upper limit is preferably 5,000 from the viewpoint of the easy synthesis of the poly(cyclic formal).

The compounds selected from alkylene oxides, polyalkylene oxides, cyclic formals and poly(cyclic formals) are used in the copolymerization each alone or in mixtures of two or more. It is preferable to purify these compounds by removing as far as possible impurities such as water contained in the compounds before the copolymerization.

The copolymerization according to this invention is carried out in the presence of both the anionic polymerization catalyst and the Lewis acid.

The anionic polymerization catalysts for use in the present process are those which have an activity to initiate the homopolymerization of formaldehyde, with the exception of metal chelate compounds. These anionic polymerization catalysts include alkali metals, alkali metal complexes, alkali metal alkoxides, alkali metal carboxylates, alkaline earth metal carboxylates, amines, quaternary ammonium salts, quaternary phosphonium salts, organometallic compounds, and tetravalent organotin compounds.

Alkali metals such as sodium and potassium are used generally in the form of a dispersion in an organic medium.

The alkali metal complexes are complex compounds formed between alkali metals and aromatic hydrocarbons such as, for example, sodium naphthalene and potassium anthracene.

The alkali metal alkoxides are those compounds which are represented by the formula ROM (where, R is an alkyl group of 1 to 10 carbon atoms and M is an alkali metal), such as sodium methoxide, potassium tert-butoxide and potassium octoxide.

The alkali metal carboxylates are those compounds which are represented by the formula RCOOM (where, R is an alkyl group of 5 to 20 carbon atoms and M is an alkali metal), such as sodium caproate, potassium laurate and cesium stearate.

The alkaline earth metal carboxylates are those compounds which are represented by the formula $(RCOO)_2M'$ (where, R is an alkyl group of 5 to 20 carbon atoms and M' is an alkaline earth metal), such as magnesium 2-ethylhexanoate, calcium laurate, calcium stearate and strontium stearate.

The amines used in this invention include primary amines represented by the formula $RNH_2$ (where, R is an alkyl group of 1 to 20 carbon atoms), secondary amines represented by the formula $R_2NH$ (where, R is an alkyl group of 1 to 20 carbon atoms) and tertiary amines represented by the formula $R_3N$ (where, R is an alkyl group of 1 to 20 carbon atoms). Examples include ethylamine, n-butylamine, octylamine, stearylamine, di-n-propylamine, di-tert-butylamine, dioctylamine, distearylamine, triethylamine, tri-n-butylamine, trioctylamine, and diethylbenzylamine. Cyclic amines such as pyridine may also be used.

The quaternary ammonium salts are those compounds which are represented by the formula $NH_4X$ or $R_1R_2R_3R_4NX$ (where $R_1$, $R_2$, $R_3$ and $R_4$ are each selected from hydrogen atom, alkyl groups, substituted alkyl groups, aryl groups and substituted aryl groups, without any restriction in their combination; X is an anion formed by eliminating hydrogen ion from a Lewis acid having a dissociation constant of from $1 \times 10^{-2}$ to $1 \times 10^{-16}$ in water at 25° C.). Examples of quaternary ammonium salts include ammonium laurate, ammonium stearate, tetramethylammonium acetate, tetramethylammonium propionate, tetrabutylammonium caproate, tetrabutylammonium methoxide, trioctylbenzylammonium acetate, dimethyldistearylammonium propionate, diethyldibenzylammonium laurate, tetramethylammonium methoxide, trimethylbenzylammonium acetate, trimethylbenzylammonium propoxide, triphenylmethylammonium butoxide, tetrabutylammonium hydroxide, dimethyldistearylammonium hydroxide, dimethyldistearylammonium acetate, tetraethylammonium carboxylate and lecithin.

The quaternary phosphonium salts are the compounds represented by the formula $R_1R_2R_3R_4PX$ (where $R_1$, $R_2$, $R_3$ and $R_4$ are each selected from hydrogen atom, alkyl groups, substituted alkyl groups, aryl groups and substituted aryl groups without any restriction in their combination; X is an anion formed by eliminating hydrogen ion from a Lewis acid having a dissociation constant of from $1 \times 10^{-2}$ to $1 \times 10^{-16}$ in water at 25° C.). Examples of quaternary phosphonium salts include tetraethylphosphonium propionate, tetraethylphosphonium ethoxide, tetrabutylphosphonium acetate, tetrabutylphosphonium propionate, tetraoctylphosphonium caproate, triphenylmethylphosphonium propionate, tetrabutylphosphonium ethoxide, triethylbenzylphosphonium butoxide, tetraoctylphosphonium hydroxide, and tetraethylphosphonium carboxylate.

The first group of the organometallic compounds is the compounds represented by the formula RM (where, R is an alkyl group of 1 to 10 carbon atoms and M is an alkali metal) or $R_2M'$ (where, R is an alkyl group of 1 to 10 carbon atoms and M' is an alkaline earth metal) such as methyllithium, n-butyllithium, ethylsodium, sec-butylpotassium, diethylcalcium and dioctylstrontium.

The second group of the organometallic compounds is the compounds represented by the formula RMgX' (where, R is an alkyl group of 1 to 8 carbon atoms and X' is a halogen atom), such as methylmagnesium chloride, ethylmagnesium bromide and butylmagnesium iodide.

The tetravalent organotin compounds are the compounds represented by the formula $R_{1m}SnX_{4-m}$ (where, m is 1 to 3; $R_1$'s, which may be the same or different, are selected from alkyl groups, substituted alkyl groups, aryl groups and substituted aryl groups; X is a halogen atom, —OH, $OR_2$ or

$R_2$ being an alkyl group of 1 to 20 carbon atoms). Examples of these organotin compounds include methyltin trichloride, ethyltin triacetate, butyltin trimethoxide, dimethyltin dibromide, diisopropyltin dilaurate, dioctyltin dibutoxide, dibutyltin diacetate, dibutyltin dilaurate, dibutyltin hydroxystearate, dioctyltin dilaurate, triethyltin ethoxide, tributyltin stearate, and trioctyltin methoxide.

The Lewis acids for use in the process of this invention include so-called Friedel Crafts-type compounds such as tin tetrachloride, tin tetrabromide, titanium tetrachloride, aluminum trichloride, zinc chloride, vanadium trichloride, antimony pentafluoride, boron trifluoride, and coordination compounds of boron trifluoride, such as boron trifluoride diethyl etherate, boron trifluoride dioxanate, boron trifluoride acetic anhydrate, and boron trifluoride triethylamine complex and boron trifluoride tributylamine complex; inorganic and organic acids such as perchloric acid, acetyl perchlorate, hydroxyacetic acid, trichloroacetic acid, and p-toluenesulfonic acid; complex-salts such as triethyloxonium tetrafluoroborate, triphenylmethyl hexafluoroantimonate, aryldiazonium hexafluorophosphate, and arylidazonium tetrafluoroborate; and alkylmetal compounds such as diethylzinc, triethylaluminum, and diethylaluminum chloride.

Of these Lewis acids, the Friedel Crafts-type compounds and the complex-salt compounds are preferred in view of the activity. When used in increased amounts, the inorganic or organic acids and the alkylmetals may also exhibit the effects comparable to those of the Friedel Crafts-type compounds and the complex salt compounds.

In the process of this invention, the molecular weight of the polyacetal copolymer may be regulated as desired by using a molecular weight regulator. The molecular weight regulators for use in the present process include acetal compounds, orthoformic esters, alcohols, carboxylic acids, carboxylic acid anhydrides and water.

The first group of the acetal compounds includes formal and hemiformal compounds represented by the formulas $ROCH_2OR$ (where R is an alkyl group) and $HOCH_2OR$ (where R is an alkyl group), respectively. Specific examples are methylal, diethoxymethane, di-n-butoxymethane, and butoxyhydroxymethane. The second group of acetal compounds is polyacetal compounds represented by the formula $RO(CH_2O)_lR$ (where, R is an alkyl group and l is 2 to 20). Specific examples are dioxymethylene dimethoxide, tetraoxymethylene diethoxide, and decaoxymethylene dimethoxide. These compounds are often difficult to be isolated in single substance and are usually used as mixtures. The degree of polymerization of these compounds may be determined by means of nuclear magnetic resonance spectrum (NMR), gas chromatography (GC) or liquid chromatography (LC). The third group of the acetal compounds include those compounds which are represented by the formula

(where, R is an alkyl group). Specific examples include dimethylacetal, diethylacetal, di-tert-butylacetal and dioctylacetal.

The orthoformic esters are the compounds represented by the formula $HC(OR)_3$ (where, R is an alkyl group of 1 to 4 carbon atoms or an aryl group) such as methyl orthoformate, ethyl orthoformate, isopropyl orthoformate, diethylpropyl orthoformate, butyl orthoformate and phenyl orthoformate.

The alcohols are the compounds represented by the formula ROH (where, R is an alkyl group of 1 to 20 carbon atoms, substituted alkyl group, aryl group or substituted aryl group) including aliphatic alcohols such as methanol, ehtanol, n-propanol, n-butanol, lauryl alcohol and stearyl alcohol and aromatic alcohols such as benzyl alcohol and 2-phenylethanol.

The carboxylic acids are the compounds represented by the formula RCOOH (where, R is hydrogen atom, an alkyl group of 1 to 20 carbon atoms, substituted alkyl group, aryl group, or substituted aryl group) including aliphatic carboxylic acids such as formic acid, acetic acid, propionic acid, lauric acid and stearic acid, and aromatic carboxylic acids such as benzoic acid and isophthalic acid.

The carboxylic acid anhydrides are the compounds represented by the formula

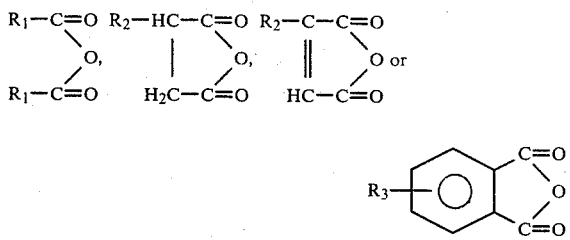

(where, $R_1$ is an alkyl group of 1 to 20 carbon atoms, $R_2$ is hydrogen atom or an alkyl group of 1 to 8 carbon atoms and $R_3$ is hydrogen atom or an alkyl group of 1 to 8 carbon atoms) including aliphatic carboxylic anhydrides such as acetic anhydride, propionic anhydride, stearic anhydride, succinic anhydride, dodecenylsuccinic anhydride, and maleic anhydride and aromatic carboxylic anhydride such as phthalic anhydride and 4-methylphthalic anhydride.

Of the above-mentioned molecular weight regulators, formal compounds of the formula $ROCH_2OR$, polyacetal compounds of the formula $RO(CH_2O)_nR$, and acetal compounds of the formula

are preferred from the viewpoint of the improved stability of the polyacetal copolymers; methylal and diethylacetal are particularly preferred from the standpoint of the easy purification and availability.

The copolymerization according to this invention is carried out generally in organic media. The organic media suitable for use in the present process are aliphatic hydrocarbons such as n-pentane, n-hexane, n-heptane, n-octane, cyclohexane, and cyclopentane; aromatic hydrocarbons such as benzene, toluene and xylenes; aliphatic halogenated hydrocarbons such as methylene chloride, chloroform, carbon tetrachloride, ethylene chloride, and trichloroethylene; and aromatic halogenated hydrocarbons such as chlorobenzene, o-dichlorobenzene, and α-chloronaphthalene. These organic media may be used each alone or in combinations of two or more.

The formaldehyde for use in the present process should be substantially anhydrous and should be purified by known techniques such as cold trap method and solvent-washing method.

In forming the polyacetal copolymer according to this invention there may be employed either a gas-blowing polymerization method or a solution polymerization method which has been conventionally used in the homopolymerization of formaldehyde.

In the gas-blowing polymerization method, formaldehyde is directly introduced into an organic medium containing a compound selected from alkylene oxides, poly(alkylene oxides), cyclic formals, and poly(cyclicformals) (hereinafter such a selected compound is referred to simply as the compound), a molecular weight regulator if used, an anionic polymerization catalyst and a Lewis acid. In the solution polymerization method, formaldehyde is first absorbed in a cooled organic medium containing the compound and a molecular weight regulator if used. Thereafter, copolymerization is initiated by adding simultaneously both the anionic polymerization catalyst and the Lewis acid.

The compound to be copolymerized with formaldehyde is used in an amount of 0.01 to 100, preferably 0.1 to 50 parts by weight for 100 parts by weight of formaldehyde.

The anionic polymerization catalyst is used in a concentration of $1 \times 10^{-8}$ to $1 \times 10^{-2}$, preferably $5 \times 10^{-8}$ to $5 \times 10^{-3}$ mole per liter of the organic medium. The Lewis acid is used in a concentration of $1 \times 10^{-7}$ to $5 \times 10^{-2}$, preferably $1 \times 10^{-5}$ to $5 \times 10^{-3}$ mole per liter of the organic medium. It is desirable that the anionic polymerization catalyst and the Lewis acid not be mixed together before use but be directly fed separately to the organic medium in which the copolymerization is to be carried out. It is quite surprising that the coexistent anionic polymerization catalyst and Lewis acid in an organic medium retain the copolymerization activity without undergoing deactivation.

The copolymerization temperature is generally set at $-40°$ to $118°$ C. The reaction time is generally in the range from 5 to 400 minutes, though not limitative.

When a molecular weight regulator is used, it is dissolved or dispersed uniformly in an organic medium in a concentration which may be easily predetermined depending upon the desired molecular weight of the copolymer.

After completion of the copolymerization, the copolymer is generally separated from the organic medium and stabilized by either capping the terminal group by esterification, etherification or urethanization or eliminating the labile terminal portion by decomposition in the presence of a base. The stabilized polyacetal copolymer is further incorporated with a stabilizer and other additives to be ready for use.

The process of this invention described above in detail has made it possible to produce an excellent polyacetal copolymer. The features of this invention may be listed as follows:

(1) Polyacetal copolymers having a sufficiently high molecular weight is obtained because of reduced side reaction (chain-scission reaction) during copolymerization.

(2) Polyacetal copolymers having a structure in which oxyalkylene units are randomly distributed in the oxymethylene main chain may be obtained.

(3) Polyacetal copolymers with excellent stability may be obtained.

(4) Polyacetal copolymers having any intended molecular weight may be obtained by using a molecular weight regulator. Both molecular weight and stability may be simultaneously improved by using a specific molecular weight regulator.

The invention is illustrated below with reference to Examples which are not limitative. In the following examples, the reduced viscosity is a value determined in p-chlorophenol/tetrachloroethylene (1:1 by weight) solution at a polymer concentration of 0.5 g/dl at 60° C. and is a measure of molecular weight. The base stabilization yield is the percentage recovery of the polymer when a 5% solution of the polymer in benzyl alcohol containing 1% of tributylamine is heated at 140° C. for 60 minutes and is a measure of stability of the polymer as well as a measure of randomness of the polymer structure. $K_{222}$ is the rate constant of thermal degradation of the polymer at 222° C. in vacuum and is a measure of stability of the polymer.

EXAMPLE 1

Paraformaldehyde, which had been thoroughly dried by dehydration, was thermally decomposed at a temperature in the range of 135° to 145° C. and the resulting gaseous mixture was passed several times through a cold-trap to obtain gaseous formaldehyde of 99.9% purity. The gaseous formaldehyde was introduced at a rate of 125 parts/hour (parts are by weight; hereinafter the same applies) into 500 parts of cyclohexane containing 12 g/liter of ethylene oxide, $0.8 \times 10^{-4}$ mole/liter of n-butyllithium, $2.5 \times 10^{-4}$ mole/liter of boron trifluoride diethyl etherate and 0.09 g/liter of methylal as molecular weight regulator. Simultaneously with the feeding of formaldehyde, there was introduced continuously for 3 hours 500 parts/hour of cyclohexane containing 12 g/liter of ethylene oxide, 0.8 mole/liter of n-butyllithium, 2.5 mole/liter of boron trifluoride diethyl etherate, and 0.09 g/liter of methylal. The gaseous formaldehyde was fed continuously at a rate of 125 parts/hour while maintaining the copolymerization temperature at 55° C. The cyclohexane containing the copolymer was removed at a rate corresponding to that of feeding. The copolymer was collected by filtration, thoroughly washed with acetone, and dried in vacuo at 60° C. to obtain 355 parts of a white polymer which showed a reduced viscosity of 1.95, a base stabilization yield of 97.5%, and a $K_{222}$ value of 0.02%/minute after the base stabilization. Thus, the copolymer had an excellent stability and an intended molecular weight. The yield of the copolymer was high.

EXAMPLES 2 TO 13

Gaseous formaldehyde of 99.9% purity was fed continuously for 3 hours at a rate of 100 parts/hour to 500 parts of toluene containing the compound, anionic polymerization catalyst, Lewis acid and molecular weight regulator as shown in Table 1. Along with the gaseous formaldehyde, there was fed continuously for 3 hours at a rate of 500 parts/hour toluene containing the compound, anionic polymerization catalyst, Lewis acid, and molecular weight regulator shown in Table 1, while maintaining the copolymerization temperature at 50° C. The copolymer was separated from the toluene, then treated and analyzed similarly to Example 1. The results obtained were as shown in Table 1. From the table, it is apparent that in each Example, there was obtained in a high yield a copolymer having an excellent stability and an intended molecular weight when a molecular weight regulator was employed.

COMPARATIVE EXAMPLE 1

The procedure of Example 1 was repeated, except that the n-butyllithium was omitted from the reagents which were employed. The results were as shown in Table 1. As is apparent from the table, only a polymer having a low molecular weight was obtained.

COMPARATIVE EXAMPLE 2

The procedure of Example 1 was repeated, except that boron trifluoride diethyl etherate was omitted from the reagents which were employed. The results were as shown in Table 1. As is apparent from Table 1, only polyoxymethylene homopolymer together with very little copolymer was obtained.

EXAMPLE 14

Into 800 parts of toluene containing 15 g/liter of ethylene oxide and 0.28 g/liter of methylal, was introduced 300 parts of 99.9% pure formaldehyde to prepare a solution containing absorbed formaldehyde. Copolymerization was initiated by adding separately dioctyltin dilaurate and boron trifluoride dibutyl etherate without prior intermixing. The polymerization temperature was maintained at 13° C. After 120 minutes from the initiation of copolymerization, 300 parts of a 2% triethylamine solution in methanol was added to terminate the copolymerization. The copolymer was separated, then washed thoroughly with acetone and dried in vacuo to obtain 298 parts of a white polymer having a reduced viscosity of 2.23 and a melting point of 165° C. The thus obtained polyacetal copolymer showed a base stabilization yield of 97.2% and $K_{222}$ of 0.03%/minute after the base stabilization. On analysis of the NMR spectrum, it was found that the oxyethylene content was 2.1% by weight and the oxyethylene units were randomly distributed in the polymer.

EXAMPLES 15 TO 21

Into 800 parts of toluene containing the compound and the molecular weight regulator shown in Table 2, was introduced 300 parts of gaseous formaldehyde to prepare a solution containing absorbed formaldehyde. Copolymerization was initiated by separately adding the anionic polymerization catalyst and the Lewis acid shown in Table 2 to the above solution. The copolymerization temperature was maintained at 25° C. After 90 minutes from the initiation of copolymerization, a solution of tributylamine in acetone was added to terminate the copolymerization. The polymer was separated from the toluene and analyzed. The results obtained were as shown in Table 2. It is seen that in each Example a polyacetal copolymer with excellent stability was obtained.

COMPARATIVE EXAMPLE 3

The procedure of Example 14 was repeated, except that the dioctyltin dilaurate was omitted from the reagents employed in Example 14. The results were as shown in Table 2. The molecular weight was found to be low owing to the prevalent side reaction (chain-scission reaction). Owing to its low molecular weight, the copolymer was of no value as an engineering plastic.

COMPARATIVE EXAMPLE 4

The procedure of Example 14 was repeated, except that the boron trifluoride dibutyl etherate was omitted from the reagents employed in Example 14. The results were as shown in Table 2. The resulting polymer was entirely polyoxymethylene homopolymer and none of the copolymer was formed. Methylal showed no effect on the molecular weight.

TABLE 1

| Example No. | Compound (g/liter) | Anionic polymerization catalyst ($\times 10^{-4}$ mole/liter) | Lewis acid ($\times 10^{-4}$ mole/liter) |
| --- | --- | --- | --- |
| 2 | Propylene oxide 18 | Sodium naphthalene 1.5 | Boron trifluoride tributylamine complex 3.0 |

TABLE 1-continued

| | Compound | (g/liter) | Anionic polymerization catalyst | (g/liter) | Lewis acid | (g/liter) |
|---|---|---|---|---|---|---|
| 3 | Poly(ethylene glycol) (av. mol. wt. 1,200) | 40 | Tetrabutylammonium methoxide | 2.1 | Triethyloxonium tetrafluoroborate | 4.0 |
| 4 | Poly(propylene glycol) (av. mol. wt. 6,400) | 35 | n-Butyllithium | 1.5 | Boron trifluoride dioxanate | 4.2 |
| 5 | 1,4-Butanediol formal | 30 | Dioctyltin dilaurate | 1.0 | Boron trifluoride | 3.2 |
| 6 | Poly(1,4-butanediol formal) (av. mol. wt. 21,000) | 28 | Dibutyltin diacetate | 1.5 | Acetyl perchlorate | 3.3 |
| 7 | Isobutylene oxide | 17 | Dibutyltin dilaurate | 0.8 | Titanium tetrachloride | 5.2 |
| 8 | Diethylene glycol formal | 18 | Ethylmagnesium bromide | 5.5 | p-Toluenesulfonic acid | 40.0 |
| 9 | Styrene oxide | 10 | Dioctylamine | 3.5 | Hydroxyacetic acid | 45.0 |
| 10 | Cyclohexene oxide | 8 | Calcium stearate | 10.1 | Antimony pentafluoride | 3.3 |
| 11 | Ethylene glycol formal | 41 | Dimethyldistearylammonium acetate | 2.3 | Triphenylmethyl hexafluoroantimonate | 3.8 |
| 12 | Propylene glycol formal | 38 | Tetrabutylphosphonium propionate | 2.0 | Boron trifluoride dibutyl etherate | 4.5 |
| 13 | Poly(tetramethylene glycol diacetate) (av. mol. wt. 4,800) | 23 | Trimethylbenzylammonium acetate | 1.2 | tert-Butyl perchlorate | 4.5 |
| Comparative Example 1 | Ethylene oxide | 12 | — | | Boron trifluoride diethyl etherate | 2.5 |
| Comparative Example 2 | Ethylene oxide | 12 | n-Butyllithium | 1.5 | — | — |

| | | | Copolymer | | |
|---|---|---|---|---|---|
| Molecular weight regulator | (g/liter) | Yield (parts) | Reduced viscosity | Base stabilization yield (%) | $K_{222}$ (%/min.) |
| Diethylacetal | 0.20 | 283 | 2.38 | 97.3 | 0.03 |
| Water | 0.08 | 281 | 2.33 | 90.9 | 0.07 |
| — | — | 283 | 4.35 | 90.9 | 0.07 |
| Methylal | 0.10 | 280 | 2.35 | 97.5 | 0.03 |
| — | — | 280 | 4.03 | 92.0 | 0.06 |
| Propionic anhydride | 0.96 | 280 | 2.51 | 94.8 | 0.04 |
| Acetic acid | 0.50 | 285 | 2.40 | 93.6 | 0.05 |
| Diethoxymethane | 0.15 | 281 | 2.54 | 97.5 | 0.03 |
| — | — | 282 | 4.33 | 91.8 | 0.06 |
| Methylal | 0.11 | 283 | 2.30 | 97.2 | 0.03 |
| Methanol | 0.15 | 280 | 2.09 | 93.8 | 0.05 |
| Methyl orthoformate | 0.46 | 285 | 2.51 | 90.9 | 0.07 |
| Methylal | 0.09 | 278 | 0.33 | 90.8 | 0.08 |
| Methylal | " | 278 | 5.82 | 3.6 | not determinable |

TABLE 2

| Example No. | Compound | (g/liter) | Anionic polymerization catalyst | (g/liter) | Lewis acid |
|---|---|---|---|---|---|
| 15 | Glycerol-ethylene oxide adduct (av. mol. wt. 3,900) | 62 | Potassium octoxide | | Tin tetrachloride |
| 16 | Poly(ethylene glycol) monostearate) (av. mol. wt. 8,500) | 40 | Cesium stearate | | Boron trifluoride acetic anhydrate |
| 17 | 1,5-Pentenediol formal | 40 | Trioctylamine | | Trifluoromethanesulfonic acid |
| 18 | 1,6-Hexanediol formal | 41 | Tetraethylphosphonium ethoxide | | Arlyldiazonium hexafluorophosphate |
| 19 | poly(ethylene glycol formal) (av. mol. wt. 14,900) | 30 | Tetramethylammonium acetate | | Diethylzinc |
| 20 | Triethylene glycol formal | 18 | Trioctyltin methoxide | | Aluminum trichloride |
| 21 | Poly(diethylene glycol formal) (av. mol. wt. 18,500) | 30 | Lecithin | | Zinc chloride |
| Comparative Example 3 | Ethylene oxide | 15 | — | | Boron trifluoride dibutyl etherate |
| Comparative Example 4 | Ethylene oxide | " | Dioctyltin dilaurate | | — |

Copolymer

TABLE 2-continued

| Molecular weight regulator | (g/liter) | Yield (parts) | Reduced viscosity | Base stabilization yield (%) | $K_{222}$ (%/min.) |
|---|---|---|---|---|---|
| — | — | 290 | 7.10 | 90.6 | 0.07 |
| — | — | 292 | 7.45 | 90.9 | 0.07 |
| Diethylacetal | 0.62 | 298 | 2.40 | 97.5 | 0.03 |
| Methylal | 0.27 | 297 | 2.40 | 97.0 | 0.03 |
| Stearyl alcohol | 0.88 | 295 | 2.33 | 93.3 | 0.05 |
| Butyl orthoformate | 0.92 | 293 | 2.21 | 95.6 | 0.04 |
| Stearic anhydride | 2.85 | 290 | 2.50 | 92.8 | 0.05 |
| Methylal | 0.28 | 288 | 0.83 | 90.1 | 0.08 |
| Methylal | " | 283 | >10 | 0 | not determinable |

What is claimed is:

1. A process for producing a polyacetal copolymer, which comprises: copolymerizing formaldehyde and a compound selected from the group consisting of alkylene oxides, poly (alkylene oxides), cyclic formals and poly(cyclic formals) in the presence of an effective copolymerizing amount of a Lewis acid and an anionic polymerization catalyst with the exception of metal chelate compounds, wherein copolymerization is conducted in a reaction medium and said Lewis acid and said anionic polymerization catalyst coexist in said reaction medium while retaining copolymerization activity.

2. A process according to claim 1, wherein said compound is an alkylene oxide.

3. A process according to claim 2, wherein said alkylene oxide is a compound represented by the general formula

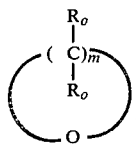

wherein each $R_o$, which may be the same or different, is selected from the group consisting of a hydrogen atom, an alkyl group, a substituted alkyl group, an aryl group, and a substituted aryl group and m is an integer of 2 to 6.

4. A process according to claim 2, wherein the alkylene oxide is ethylene oxide, propylene oxide, butylene oxide or styrene oxide.

5. A process according to claim 2, wherein the alkylene oxide is cyclohexene oxide.

6. A process according to claim 1, wherein said compound is a poly(alkylene oxide).

7. A process according to claim 6, wherein the poly(alkylene oxide) is a compound represented by the general formula

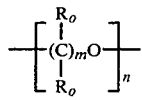

wherein each $R_o$, which may be the same or different, is selected from the group consisting of a hydrogen atom, an alkyl group, a substituted alkyl group, an aryl group, and a substituted aryl group, m is an integer of 2 to 6 and n is 3 to 20,000.

8. A process according to claim 6, wherein the poly(alkylene oxide) is poly(ethylene oxide), a poly(ethylene oxide) derivative, poly(propylene oxide) or a poly(propylene oxide) derivative.

9. A process according to claim 7 or 8, wherein the average degree of polymerization (n) of the poly (alkylene oxide) is in the range of 10 to 10,000.

10. A process according to claim 1, wherein said compound is a cyclic formal.

11. A process according to claim 10, wherein the cyclic formal is a cyclic alkylene glycol formal having a structure represented by the general formula

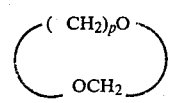

wherein p is an integer of 2 to 10.

12. A process according to claim 1 or 11, wherein the cyclic formal is ethylene glycol formal, 1,4-butanediol formal, 1,5-pentanediol formal or 1,6-hexanediol formal.

13. A process according to claim 10, wherein the cyclic formal is a cyclic poly(ethylene glycol) formal having a structure represented by the general formula

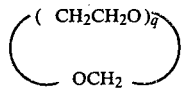

wherein q is 2 to 15.

14. A process according to claim 1 or 13, wherein the cyclic formal is diethylene glycol formal, triethylene glycol formal, or tetraethylene glycol formal.

15. A process according to claim 10, wherein the cyclic formal is a compound having a structure represented by the general formula

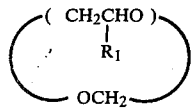

wherein $R_1$ is an alkyl group or aryl group.

16. A process according to claim 1 or 15, wherein the cyclic formal is propylene glycol formal.

17. A process according to claim 1, wherein said compound is a poly(cyclic formal).

18. A process according to claim 17, wherein the poly(cyclic formal) is a poly(cyclic alkylene glycol formal) represented by the general formula

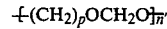

wherein p is an integer of 2 to 10 and n' is 3 to 20,000.

19. A process according to claim 1 or 18, wherein the poly(cyclic formal) is poly(ethylene glycol formal), poly(1,4-butanediol formal), poly(1,5-pentanediol formal) or poly(1,6-hexanediol formal).

20. A process according to claim 17, wherein the poly(cyclic formal) is a poly(cyclic polyethylene glycol formal) having a structure represented by the formula $$\text{\textendash}(CH_2CH_2O)_qCH_2O\text{\textendash}_{n'}$$

wherein q is an integer of 2 to 10 and n' is 3 to 20,000.

21. A process according to claim 1 or 20, wherein the poly(cyclic formal) is poly(diethylene glycol formal), poly(triethylene glycol formal) or poly(tetraethylene glycol formal).

22. A process according to claim 18 or 20, wherein the average degree of polymerization (n') of the poly(cyclic formal) is in the range of 5 to 5,000.

23. A process according to claim 1, wherein the copolymerization is carried out in the presence of a molecular weight regulator.

24. A process according to claim 23, wherein the molecular weight regulator is an acetal compound having a structure represented by the general formula $ROCH_2OR$, $RO(CH_2O)_lR$, or $$\underset{CH_3}{ROCHOR,}$$

wherein R is an alkyl group and l is 2 to 20.

25. A process according to claim 23, wherein the molecular weight regulator is methylal or diethylacetal.

26. A process according to claim 1, wherein the copolymerization is carried out in an organic medium.

27. A process according to claim 1 or 26, wherein said Lewis acid and said anionic polymerization catalyst are directly fed separately, without prior intermixing, to effect copolymerization.

28. A process according to claim 1, wherein said anionic polymerization catalyst is selected from the group consisting of alkali metals, alkali metal complexes, alkali metal alkoxides, alkali metal carboxylates, alkaline earth metal carboxylates, amines, quaternary ammonium salts, quaternary phosphonium salts, organometallic compounds, and tetravalent organotin compounds.

29. A process according to claim 26, wherein said organic medium is selected from the group consisting of aliphatic hydrocarbons, aromatic hydrocarbons, aliphatic halogenated hydrocarbons and aromatic halogenated hydrocarbons.

30. A process according to claim 1, wherein the compound to be copolymerized with formaldehyde is used in an amount of 0.1 to 50 parts by weight for 100 parts by weight of formaldehyde.

31. A process according to claim 26, wherein the anionic polymerization catalyst is used in a concentration of $1 \times 10^{-8}$ to $1 \times 10^{-2}$ mole per liter of the organic medium.

* * * * *